J. H. MONROE.
SPECTACLES.
APPLICATION FILED JUNE 10, 1907.
981,872.
Patented Jan. 17, 1911.
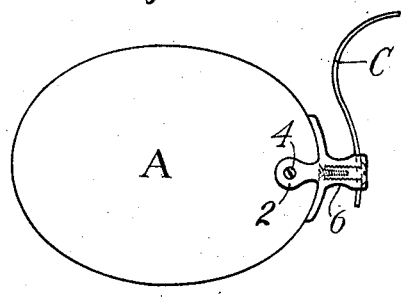
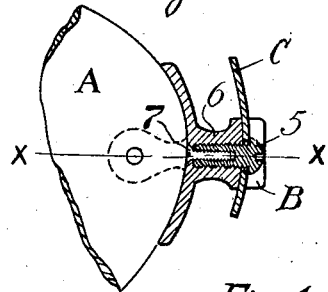
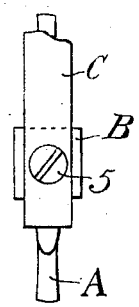
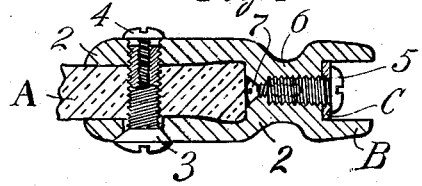
Witnesses,
George Voelker
Hattie Smith
Inventor,
James H. Monroe
by Lothrop Johnson
his Attorneys.

UNITED STATES PATENT OFFICE.

JAMES HENRY MONROE, OF SANTA CRUZ, CALIFORNIA.

SPECTACLES.

981,872.     Specification of Letters Patent.     Patented Jan. 17, 1911.

Application filed June 10, 1907. Serial No. 378,139.

*To all whom it may concern:*

Be it known that I, JAMES HENRY MONROE, a citizen of the United States, residing at Santa Cruz, in the county of Santa Cruz and State of California, have invented certain new and useful Improvements in Spectacles, of which the following is a specification.

My invention relates to improvements in eye-glasses, its object being to provide improved means for securing the stud to the nose bow and lenses, so that the parts may not work loose.

To this end my invention consists of the features of construction and combination hereinafter particularly described and claimed.

In the accompanying drawings forming part of this specification, Figure 1 is a front view of one lens and the adjacent portion of the stud, embodying my improvements; Fig. 2 is a similar view showing the lens partly broken away, and the stud in section; Fig. 3 is an inner end view of Fig. 1; and Fig. 4 is a section on line *x—x* of Fig. 2.

In the drawings A represents one of the lenses, B the stud and C the bridge or bow. The stud is formed with the usual yoke 2 to receive the lens. Extending through the yoke-arms, and the interposed lens, as shown in Fig. 4, is an exteriorly threaded female screw 3 formed in its inner end with a threaded opening to receive the male screw 4, which is preferably threaded oppositely to the exterior threads of the female screw.

The stud is secured to the bow by means of an exteriorly threaded female screw 5 extending through the bow and longitudinally through the shank 6 of the stud. The inner end of this screw is formed with a threaded opening into which is fitted a male screw 7. The screws 5 and 7 are oppositely threaded, and the screw 7 has its head countersunk to allow the lens to fit snugly in the stud.

As is best illustrated in Fig. 4, the lens is thickened at its edge where it passes between the jaws 2 and the jaws are so shaped as to accommodate this thickened portion. The piercing of the lens for the passage of the screws 3 and 4 so weakens the lenses that they tend to easily crack at this point. By thickening the edge of the lens, as shown, movement of the lens between the jaws is more effectually prevented, and the tendency to breakage reduced.

In the ordinary construction of eye glasses the stud and glass screws often work loose by unscrewing; and as they have only the retaining strength of the few intermeshing threads, they easily break loose. In my construction it is impossible for the female screws to work loose until the male screws are entirely removed, and with the stud screws there is the additional safeguard that they cannot work loose until the lens screws also are removed.

While I have shown my invention applied to eye glasses of pince-nez type it will be apparent that it may equally well be applied to any kind of eye glasses or spectacles where the glasses are secured to the stud by screws.

I claim:

A lens holding device for eye glasses comprising a stud, integral arms carried by said stud, a lens, removable means fastening the lens between said arms, a bow supporting portion of said stud, a bow, an exteriorly threaded female screw for clamping said bow to the bow supporting portion of said stud, the internal and external threads of said screw being relatively different and a male screw fitting into said female screw and locked in place by the adjacent edge of said lens, whereby said intermeshing screws cannot be removed without the preliminary removal of said lens.

In testimony whereof I affix my signature in presence of two witnesses.

JAMES HENRY MONROE.

Witnesses:
     JOHN A. WILLIAMS,
     HENRY RHEIN.